United States Patent

[11] 3,579,776

| [72] | Inventor | Wlajko Mihic Tegnervagen 9, 802 28 Gavle, Sweden |
|---|---|---|
| [21] | Appl. No. | 776,443 |
| [22] | Filed | Nov. 18, 1968 |
| [45] | Patented | May 25, 1971 |

[54] TOOLHOLDER ASSEMBLIES
4 Claims, 2 Drawing Figs.

| [52] | U.S. Cl. | 29/96 |
|---|---|---|
| [51] | Int. Cl. | B26d 1/00 |
| [50] | Field of Search | 29/96, 98, 105, 105.1 |

[56] References Cited
UNITED STATES PATENTS

| 2,800,703 | 7/1957 | Buettner | 29/96 |
| 2,854,734 | 10/1958 | Beck | 29/96 |
| 3,137,059 | 6/1964 | Hertel | 29/96 |
| 3,314,126 | 4/1967 | Stier | 29/96 |
| 3,491,421 | 1/1970 | Holloway | 29/96 |

FOREIGN PATENTS

| 1,124,730 | 8/1968 | Great Britain | 29/105 |
| 318,815 | 2/1920 | Germany | 29/105 |

*Primary Examiner* — Harrison L. Hinson
*Attorney* — Waters, Roditi, Schwartz & Nissen ABSTRACT: A toolholder assembly incorporates a body which at one end has a recess for receiving an indexable cutting insert. A bore for a two-armed lever which is pivotally connected to the body extends from the recess in the toolholder body, and one end of the lever cooperates with the cutting insert, while the other end of the lever cooperates with a piston which is movable in the body. The piston is under the action of a pressure medium which is contained in a hollow space in the body and acted upon by a pressure actuating member movable into and out of the space.

TOOLHOLDER ASSEMBLIES

This invention relates to a toolholder assembly incorporating a body which at one end has a recess for receiving an indexable cutting insert or cutting element and which is provided with a bore for a two-armed lever pivotally connected to the body, said bore extending from the recess in the toolholder body, and one end of the lever cooperates with the indexable cutting insert while the other end of the lever cooperates with a piston movable in the body.

The characteristic feature of the invention resides in that the piston is under the action of a pressure medium which is contained in a hollow space in the toolholder body and which is acted upon by a pressure actuating member movable into and out of the space in said body. This actuating member is not bound to a given position in the toolholder assembly but can be placed wherever it is considered most suitable in point of accessibility, precisely because pressure medium is provided between the actuating member and the piston.

The invention will be more fully described in the following with reference to the accompanying drawing which illustrates an embodiment, chosen by way of example, of the toolholder assembly.

Figure 1:
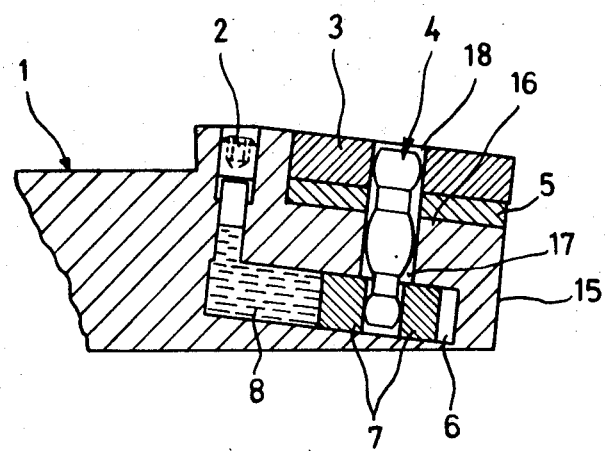
FIG. 1 is a longitudinal section of the toolholder.
Figure 2:
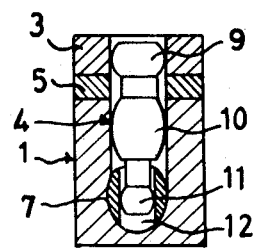
FIG. 2 is a cross section thereof.

The toolholder assembly incorporates a body 1 which at one end 15 has a recess 16 for receiving an indexable cutting insert 3 and a supporting plate 5 therefor. A cylindrical bore 17 extends from the bottom surface of the recess substantially at right angles thereto, and a two-armed lever 4 is contained in said bore. The lever 4 is an elongated body presenting rotation symmetry and being similar in shape to two bowling pins with adjoining opposite base surfaces. This shape allows the lever 4 to tilt with the peripheral surface of the intermediate portion 10 as the tilting axis. The lever 4 thus is pivotally connected to the body 1 in the cylindrical bore 17 thereof.

One end 9 of the lever 4 cooperates with the indexable cutting insert 3 while the other lever end 11 cooperates with a piston 7 movable in the body 1. To realize said cooperation the indexable cutting insert 3 has a bore 18. The supporting plate 5 also is provided with a bore that is in register with that in the cutting insert.

The piston 7 is movable in a cylindrical hollow space 8 in the body 1. Said space 8 is substantially at right angles to the cylindrical bore 17 which opens into the space 8. The piston 7 has a hollow space 12 which extends at right angles to the direction of motion of the piston, and the end 11 of the lever 4 is inserted in said hollow space 12 so as to follow the movements of the piston 7 in both directions.

The piston 7 is actuated by a pressure medium in the hollow space 8 which for this purpose coacts with a pressure actuating member 2 adapted to be moved into and out of the space 8. In the preferred embodiment illustrated, the pressure actuating member is a screw 2 having a slot in which a screwdriver or like tool can be engaged for operation of the screw 2. The end of the piston 7 facing away from the pressure medium cooperates with a resilient element 6 for instance a rubber pad, steel spring or like member.

The pressure medium in the hollow space 8 can be a fluid such as oil. However, the use of a plastic composition such as polyvinyl chloride, is preferred.

The lever 4 is rotatable and the point of application between lever 4 and cutting insert 3 can therefore readily be changed so that a uniform wear of the lever is realized. The lever 4 is in three-point contact and has straight movement so that an absolute fixation of the cutting insert in the desired position is obtained.

The device functions as follows. When the actuating member 2 is screwed into the hollow space 8 the pressure medium urges the piston 7 against the resilient element 6. The piston 7 thereby actuates the lever 4 which effects a tilting movement about the intermediate portion 10. This will press the indexable cutting insert 3 against the vertical wall of the recess 16 in which said insert is received, thereby arresting the insert by frictional engagement with said wall. At the same time the resilient element 6 is compressed. When the cutting insert 3 is to be untightened the actuating member 2 is turned in the reverse direction, the element 6 pushing the piston 7 back again, which in turn reacts on the lever 4 so that the indexable cutting insert 3 is disengaged from the walls of the recess 16 receiving said insert.

Modifications can be resorted to within the scope of the appended claims.

I claim:

1. A toolholder assembly incorporating a body having at one end a recess for receiving an indexable cutting insert and provided with a bore which extends from the recess receiving the cutting insert and accommodates a two-armed lever pivotally connected to the body, one end of said lever cooperating with the indexable cutting insert while the other end of the lever cooperates with a piston movable in the body, the piston being under the action of a pressure medium which is contained in a hollow space in said body, said pressure medium being acted upon by a pressure actuating member in the form of a screw movable into and out of said space, wherein said hollow space extends at right angles to the direction of motion of the piston, said other end of the lever being inserted in said hollow space in the piston.

2. A toolholder assembly as claimed in claim 1, wherein the pressure medium is a plastic composition.

3. A toolholder assembly as claimed in claim 2, wherein the plastic composition is polyvinyl chloride.

4. A toolholder assembly as claimed in claim 1, wherein the end of the piston facing away from the pressure medium is adapted to cooperate with a resilient element, for instance of rubber.

UNITED STATES PATENT OFFICE
CERTIFICATE OF CORRECTION

Patent No. 3,579,776        Dated May 25, 1971

Inventor(s) WLAJKO MIHIC

It is certified that error appears in the above-identified patent and that said Letters Patent are hereby corrected as shown below:

On the cover sheet sheet -- [30] Claims priority, application Sweden, November 21, 1967, 15 963/67 --.

Signed and sealed this 1st day of May 1973.

(SEAL)
Attest:

EDWARD M. FLETCHER, JR.
Attesting Officer

ROBERT GOTTSCHALK
Commissioner of Patents